United States Patent [19]

Torii et al.

[11] 4,406,490
[45] Sep. 27, 1983

[54] LICENSE PLATE HOLDER

[75] Inventors: Hiromasa Torii, Koganei; Takeshi Watanabe, Tokyo, both of Japan

[73] Assignee: Nissan Motor Co., Ltd., Yokohama, Japan

[21] Appl. No.: 185,475

[22] Filed: Sep. 9, 1980

[30] Foreign Application Priority Data

Sep. 11, 1979 [JP] Japan .................... 54-116347

[51] Int. Cl.³ .............................. B62D 63/04
[52] U.S. Cl. ..................... 296/1 C; 362/82
[58] Field of Search ............ 296/1 C; 40/591, 200; 362/61, 82, 83, 80, 64

[56] References Cited

U.S. PATENT DOCUMENTS

| 1,383,978 | 7/1921 | Brewster | 296/1 C |
| 1,588,075 | 6/1926 | Wiebe | 296/1 C |
| 2,280,558 | 4/1942 | Thompson | 362/82 |
| 2,454,722 | 11/1948 | Slamka | 296/1 C |
| 2,689,948 | 9/1954 | Rothman | 362/83 |
| 2,707,650 | 5/1955 | Lawton, Jr. | 362/82 |

OTHER PUBLICATIONS

"The Sports Car" Colin Campbell, published 1970, photograph No. 10.
Photograph of Rear License Plate Holder of 1953 Jaguar XK-120.

Primary Examiner—Joseph F. Peters, Jr.
Assistant Examiner—Ross Weaver
Attorney, Agent, or Firm—James Creighton Wray

[57] ABSTRACT

A license plate holder at the rear panel of a vehicle includes a plate holder member which affords a first flat surface portion and contiguous thereto a pair of second flat surface portions. The license plate is mounted on the first surface portion, and illuminating lamps for the license plate are mounted on the second surface portions. Standardized lamps having flat bottom surfaces are used as the illuminating lamps regardless of the shape of the rear panel, eliminating preparation of various types of the lamps.

4 Claims, 6 Drawing Figures

LICENSE PLATE HOLDER

BACKGROUND OF THE INVENTION

1. Field of the Invention:

The present invention relates to a license plate holder at the rear panel of a vehicle body.

2. Description of the Prior Art:

Generally, a rear panel of the vehicle body is formed as a curved or stepped surface on which a license plate and illumination lamps therefor are separately mounted. Thus, the license plate cannot be mounted directly on the rear panel in a stable manner. As shown in FIGS. 1 and 2, it has been a conventional practice to secure on the rear panel 3 of the vehicle body 1 a suitable holder 2 in the form of brackets or the like to define a plane on which the license plate is mounted. A pair of lamps 4 for illuminating the license plate are disposed on both sides of the license plate, and mounted directly on the rear panel 3. To this end, the lamps 4 must be so molded as to provide a bottom surface which conforms with the curved or stepped surface of the rear panel. Consequently, a number of types of illuminating lamps must be prepared for various kinds of vehicles having different shapes or curvatures at the rear panel, which is disadvantageous from the viewpoint of parts stock control and manufacturing cost.

SUMMARY OF THE INVENTION

Accordingly, it is a primary object of the present invention to provide an improved license plate holder which permits utilization of standardized illuminating lamps.

Another object of the present invention is to provide a license plate holder which suitably forms a subassembly to facilitate assembling works of the license plate holder and the illuminating lamps.

With these and other objects in view, the license plate holder according to the present invention comprises a plate holder member which affords a flat first surface portion to which the license plate is secured, and a pair of flat second surface portions which are contiguous with the first surface portion and on which illuminating lamps for the license plate are respectively mounted, and means to mount the plate holder member on the rear panel of a vehicle.

The present invention will now be explained in detail by referring to one preferred embodiment shown in FIGS. 3 to 6.

DESCRIPTION OF THE PREFERRED EMBODIMENT

Figure 1:
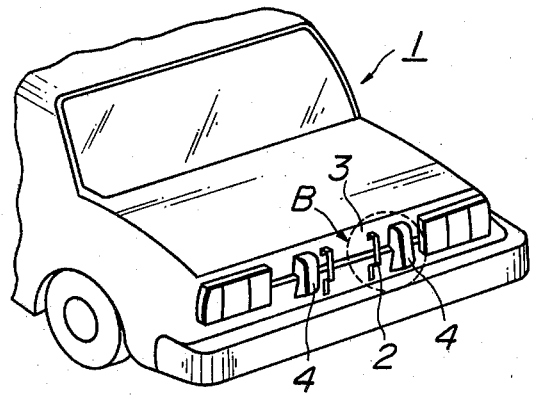
FIG. 1 is a perspective view showing the rear portion of a vehicle including a conventional license plate holding means mentioned hereinbefore.
Figure 2:
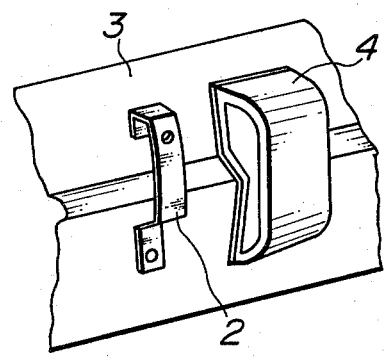
FIG. 2 is a perspective view in an enlarged scale showing the detail of the conventional arrangement shown at B in FIG. 1.

Referring now to FIGS. 3 to 6, there is shown a license plate holder according to one preferred embodiment of the present invention, which comprises a plate holder member 10 made, for example, of plastics material. The plate holder member 10 provides a first surface portion 11 centrally thereof, and a pair of second surface portions 12, 12' on both sides of the first surface portion 11. The first surface portion 11 is flat and is to mount thereon a license plate shown by the phantom line in FIG. 3. The second surface portions 12 are also flat, and serve to mount illuminating lamps 16, 16' in the manner to be explained hereinafter. The plate holder member 10 has side walls 13, 13' which are formed with cutout portions 14, 14' so as to conform with a curved or stepped surface of the rear panel 15.

Figure 3:
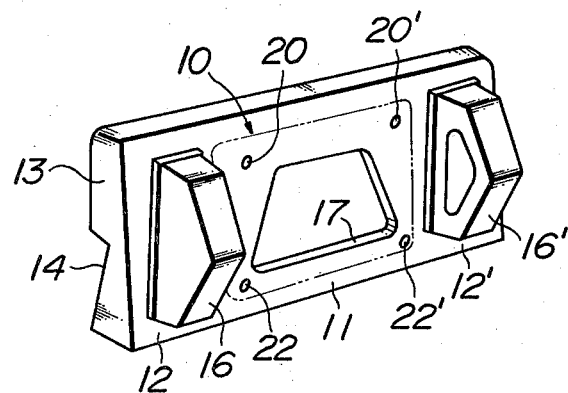
FIG. 3 is a perspective view of the license plate holder according to one preferred embodiment of the present invention.
Figure 4:
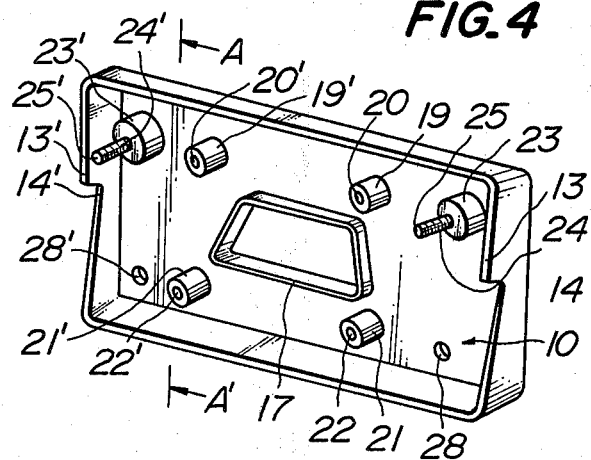
FIG. 4 is a perspective view of the rear side of the holder shown in FIG. 3.
Figure 5:
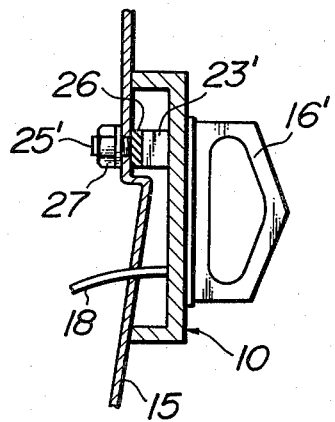
FIG. 5 is a sectional view taken along the line A—A in FIG. 4.
Figure 6:
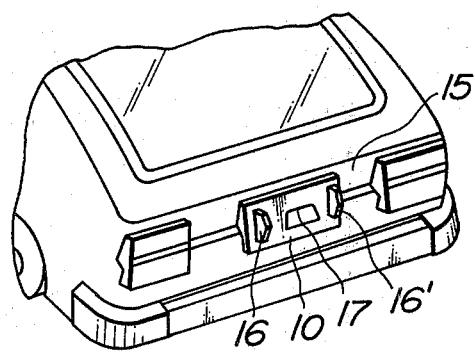
FIG. 6 is a perspective view showing the rear portion of a vehicle equipped with the holder shown in FIGS. 3 to 5.

As shown in FIGS. 3, 4 and 6, the first surface portion 11 is formed with a relatively wide opening 17 which is normally covered by the license plate and which facilitates connecting operation between a connector of a harness 18 of the illuminating lamps 16, 16' and a connector of a harness which is drawn out of the vehicle body. Those connectors are not shown in the drawings.

The plate holder member 10 on its rear surface is provided with two pairs of projections 19, 19' and 23, 23' which are aligned along the upper edge of the rear surface. The center side projections 19, 19' are formed with through bores 20, 20' which receive bolts for securing the license plate onto the first surface portion 11. The projections 23, 23' are located adjacent to the upper corner of the rear surface, and formed with through bores 24, 24' which receive bolts 25, 25' fixedly secured to the lamps 16, 16'. Those bolts 25, 25' are fitted with spacers 26 (FIG. 5) having a predetermined thickness, which are positioned between the end surface of the projections 23, 23' and the rear panel 15, and serve to mount the license plate holder on the rear panel by means of nuts 27 at the inner surface of the rear panel 15.

Furthermore, the plate holder member 10 on its rear surface is provided with a pair of projections 21, 21' which are positioned substantially below the projections 19, 19' adjacent to the lower edge of the rear surface. The projections 21, 21' are formed with through bores 22, 22' for receiving bolts which too serve to mount the license plate holder onto the rear panel 15. By suitably selecting the thickness of spacers to be positioned between the end surface of the projections 21, 21' and the rear panel 15, the angle of the license plate with respect to a horizontal plane can be adjusted to comply with domestic legislations, if any, without forming a space between the upper edge of the plate holder member 10 and the rear panel 15. Thus, such an adjustment never affects the appearance. The plate holder member 10 is formed with a pair of holes 28, 28' positioned substantially below the projections 23, 23', so as to pass the harness 18 connected to the lamps 16, 16'.

The lamps 16, 16' may be fixedly secured to the plate holder member 10 in advance, to form a subassembly, by means of adhesive substance or nuts threaded on the bolts 25, 25'. In the latter case, the projections 23, 23' may be eliminated.

It will be appreciated from the foregoing that the license plate holder according to the present invention provides first and second flat surface portions on which the license plate and the illuminating lamps therefor are respectively mounted. Thus, a standardized lamp having a flat bottom surface can be used even when the rear panel of the vehicle body is curved or stepped, thus eliminating preparation of various types of lamps. The plate holder member having a flat first surface portion to which the license plate is secured and a pair of flat panel. By this, the number of assembling steps can be reduced and the assembling operation is markedly facilitated.

What is claimed is:

1. A license plate holder for mounting the license body on a rear body panel of a vehicle, comprising a plate holder member having a flat first surface portion to which the license plate is secured and a pair of flat second surface portions which are contiguous with the first surface portion and on which illuminating lamps for the license plate are respectively mounted, and means to mount the plate holder member directly on the rear body panel, wherein the plate holder member includes an upper edge which contacts the rear panel, said mounting means including projections formed on the rear side of the plate holder member and replaceable spacers positioned between the projections and the rear panel, whereby the angle of the license plate can be adjusted with respect to a horizontal plane by selecting the thickness of the spacers.

2. A license plate holder for mounting the license plate on a rear body panel of a vehicle, comprising a plate holder member having a flat first surface portion to which the license plate is secured and a pair of flat second surface portions which are contiguous with the first surface portion and on which illuminating lamps for the license plate are respectively mounted, and means to mount the plate holder member directly on the rear body panel, wherein said first surface portion is formed with a relatively wide opening which permits an access to connectors of harness for the illuminating lamps, and which is normally covered by the license plate.

3. A license plate holder for mounting the license plate on a rear panel of a vehicle, comprising a plate holder member which affords a flat first surface portion to which the license plate is secured, and a pair of flat second surface portions which are contiguous with the first surface portion and on which illuminating lamps for the license plate are respectively mounted, and means to mount the plate holder member on the rear panel, the plate holder member and the illuminating lamps forming a subassembly, and wherein said first surface portion is formed with a relatively wide first opening which permits an access to connectors of harness for the illuminating lamps, and which is normally covered by the license plate, and said second surface portions are each formed with a second opening for passing therethrough the harness connected between the connectors and the illuminating lamps.

4. A license plate holder for mounting the license plate on a rear body panel of a vehicle, comprising a plate holder member having a flat first surface portion to which the license plate is secured and a pair of flat second surface portions which are contiguous with the first surface portion and on which illuminating lamps for the license plate are respectively mounted, and means to mount the plate holder member directly on the rear body panel, wherein the mounting means comprises connectors attached to the illuminating lamps which are configured to project through openings formed in the second surface portions and to be detachably connected to the rear panel.

* * * * *